United States Patent [19]

Takayama et al.

[11] Patent Number: 5,214,500
[45] Date of Patent: May 25, 1993

[54] COLOR ENCODER MEASUREMENT SYSTEM WITH ADJUSTMENT OF AMPLITUDE RATIO OF R, G AND B COMPONENT SIGNALS

[75] Inventors: Susumu Takayama, Kamakura; Joji Urano, Tokyo; Kazuhiro Tsuboi, Sagamihara; Katsuhiko Watanabe, Tokyo, all of Japan

[73] Assignee: Nippon Television Network Corporation, Tokyo, Japan

[21] Appl. No.: 782,389

[22] Filed: Oct. 25, 1991

[30] Foreign Application Priority Data

Apr. 24, 1991 [JP] Japan .................................. 3-94414
May 10, 1991 [JP] Japan ................................. 3-106115

[51] Int. Cl.$^5$ ......................................... H04N 17/02
[52] U.S. Cl. ..................................... 358/10; 358/27
[58] Field of Search ..................... 358/10, 139, 30, 27

[56] References Cited

U.S. PATENT DOCUMENTS

| | | | |
|---|---|---|---|
| 4,167,751 | 9/1979 | Wilcox | 358/30 |
| 4,214,258 | 7/1980 | Van der Valk | 358/139 |
| 4,679,072 | 7/1987 | Takayama | 358/27 |
| 5,001,549 | 3/1991 | Holmbo et al. | 358/10 |

FOREIGN PATENT DOCUMENTS 0117493 5/1987 Japan .
0203089 8/1988 Japan .

OTHER PUBLICATIONS

Lang et al., "Testing Color Reproduction by Means of a Programmable Color Bar Generator", SMPTE Journal, vol. 87, pp. 579-582, Sep. 1978.

Primary Examiner—James J. Groody
Assistant Examiner—Jeffrey S. Murrell
Attorney, Agent, or Firm—Dellett, Smith-Hill and Bedell

[57] ABSTRACT

Characteristics of a color encoder can be measured under the same condition as a practical operation without modifying the color encoder as a device under test. A test signal generator generates R, G and B component signals as test signals and they are applied simultaneously to the color encoder. The output amplitudes and/or output phases of the component signals from the test signal generator are adjusted such that the color encoder produces at least one of a luminance signal, an I-axis signal and a Q-axis signal in accordance with a measurement item.

16 Claims, 10 Drawing Sheets

FIG. 3

| MEASUREMENT ITEM | | TEST SIGNAL WAVEFORM |
|---|---|---|
| AMPLITUDE/ FREQUENCY | Y | 5.5MHz SWEEP (MARKER: 0.5, 1, 2, 3, 4, 5 MHz)<br>4.1MHz MULTI-BURST (0.1, 0.5, 1.25, 2, 3, 3.58, 4.1MHz) |
| | I | 3.58MHz MULTI-BURST (0.1, 0.3, 0.5, 1, 1.3, 2, 3.58 MHz)<br>1.3MHz SWEEP / 3.58MHz SWEEP<br>(MARKER: 0.3, 0.4, 0.5, 0.6, 0.7, 1.3MHz / 1, 1.3, 2, 3, 3.58 MHz) |
| | Q | 0.7MHz MULTI-BURST (0.1, 0.3, 0.4, 0.5, 0.6, 0.7 MHz)<br>1.3MHz SWEEP (MARKER: 0.3, 0.4, 0.5, 0.6, 0.7, 1 MHz) |
| DELAY TIME | Y/I | I/-I, I BAR (1.5, 2T)<br>I MULTI-PULSE (4, 6, 8, 12.5, 16, 20, 40T) |
| | Y/Q | Q/-Q, Q BAR (1.5, 2T)<br>Q MULTI-PULSE (4, 6, 8, 12.5, 16, 20, 40T) |
| MATRIX RATIO IQ QUADRATUR LINEARITY | | 100% COLOR BAR<br>SMPTE 75% COLOR BAR |

SQUARE WAVE (−)

SQUARE WAVE (+)

F I G. 10
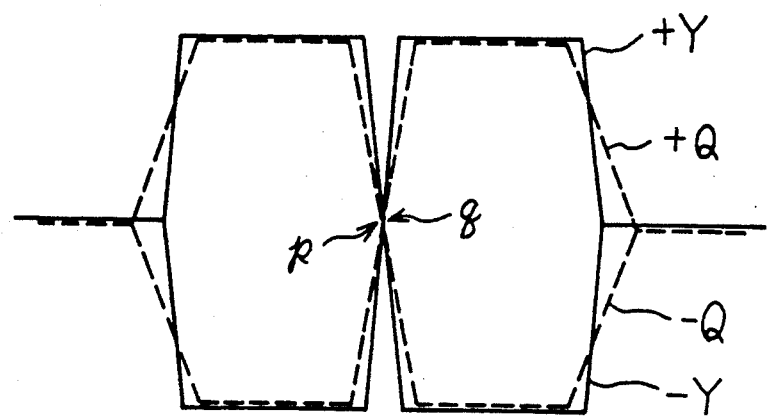
F I G. 11
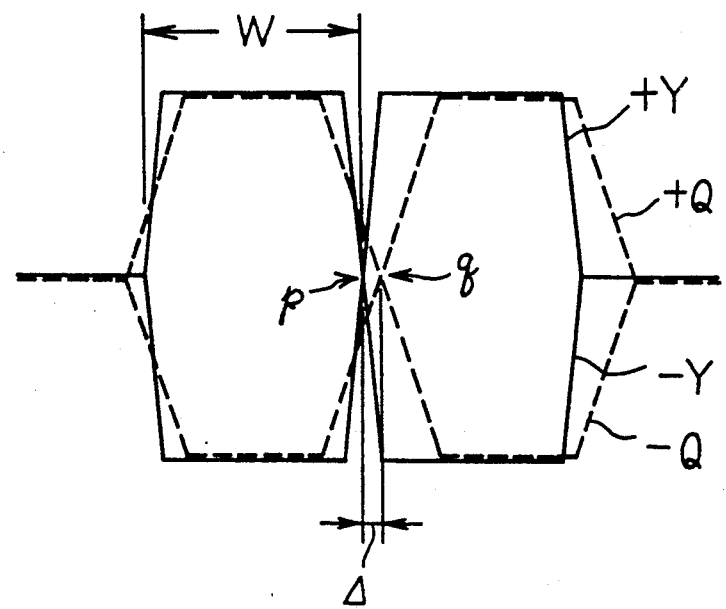

COLOR ENCODER MEASUREMENT SYSTEM WITH ADJUSTMENT OF AMPLITUDE RATIO OF R, G AND B COMPONENT SIGNALS

BACKGROUND OF THE INVENTION

The present invention relates to a color encoder measurement system which checks whether a color encoder used in a broadcasting station satisfies a standard or not.

The Wireless Telegraphy Act. of Japan requests that a color encoder or the like used in a broadcasting station should be checked whether an output signal therefrom satisfies a standard or not by measuring characteristics thereof every predetermined period. FIG. 12 shows a prior color encoder measurement system used to measure such characteristics.

In FIG. 12, a reference number 10 represents a color encoder as a device under test (DUT) and an input stage thereof is connected to a test signal generator 30 which generates a composite signal as a test signal in general. The color encoder 10 produces at an output stage thereof an output signal (composite television signal) which is applied to a characteristic measurement means 50 in order to measure a frequency characteristic and a delay time difference of the output signal from the color encoder 10. The characteristic measurement means may be a waveform observing apparatus, such as an oscilloscope 50. In this example, the color encoder 10 is for the NTSC signal but it may be for another television system signal.

The color encoder 10 is constructed by considering a practical operation but it includes a circuit to be used only for the measurement by considering the measurement. Input terminals 12r, 12g and 12b receive output component signals (e.g., R, G and B primary color component signals) from a video camera of the broadcasting station at the practical operation and receive a predetermined test signal for the characteristic measurement period. An operation while receiving the test signal will be discussed hereinafter.

The test signal for a predetermined measurement item is applied through at least one of the input terminals 12r, 12g and 12b to a matrix circuit 13 for a matrix arithmetic process. The matrix circuit 13 produces a luminance signal Y, an I-axis signal I and a Q-axis signal Q. Low pass filters 14 and 15 limit the bandwidth of the I-axis signal I and the Q-axis signal Q, and these signals I and Q are applied to a modulator 16 through a delay circuit 27 and directly to produce a color signal C.

The color signal and the luminance signal Y are applied directly and through a timing adjusting delay circuit 26 to a mixer 17 in which these signals are mixed and a well known composite sync signal is added to produce a composite television signal at an output terminal 18.

The basic construction of the color encoder 10 for the practical operation was described hereinbefore. The color encoder 10 further includes the circuit used only for the characteristic measurement. Switching means 22y, 22i and 22q are provided at the output stage of the matrix circuit 13. Each switching means 22i and 22q can select an external test signal (signal Is or Qs corresponding to the I-axis signal I or the Q-axis signal Q). Reference numbers 23i and 23q represent external input terminals. The switching means 22y, 22i and 22q select the output condition in response to external control signals applied to control signal input terminals 24y, 24i and 24q.

In this example, measurement terminals 25i, 25q and 25c are provided in order to measure the I-axis signal I and the Q-axis signal Q having the limited bandwidth from the low pass filters 14 and 15 and also to measure the color signal C.

The characteristics to be measured in such color encoder 10 are the amplitude/frequency characteristics of the luminance signal Y, the I-axis signal I and the Q-axis signal Q and the delay time difference between the luminance signal Y and the I-axis signal I and between the luminance signal Y and the Q-axis signal Q. The test signal is selected by considering the characteristic measurement item. The conventional characteristic measurement requested to select one of the three component input terminals R, G and B proper to each measurement item and to apply the test signal at the selected one to the color encoder 10 rather than applying the signals at all the component input terminals. The selection was done by considering which one of the component signals R, G and B results in the highest output level for each measurement item when the test signal is applied to the component input terminals.

For example, when the amplitude/frequency characteristic of the luminance signal Y is measured, the test signal is applied to the input terminal 12g. When the amplitude/frequency characteristic of the I-axis signal I is measured, the test signal is applied to the input terminal 12r. When the amplitude/frequency characteristic of the Q-axis signal Q is measured, the test signal is applied to the input terminal 12b.

The switching means 22y, 22i and 22q are controlled such that only the matrix output for each measurement item is applied. When the amplitude/frequency characteristic measurement of the luminance signal Y is desired, the switching means 22y is controlled as shown by a dotted line and only the luminance signal Y is outputted from the matrix circuit 13 seemingly. When the I-axis signal I is desired to be measured, the similar control is done wherein the switching means 22y is off, the switching means 22i selects the upper contact and the switching means 22q is at the neutral position. Thus, only the I-axis signal I from the matrix circuit 13 is the measured signal to the color modulator If the color encoder 10 is constructed to receive the I-axis signal I and the Q-axis signal Q in addition to the component signals R, G and B and the characteristics of the low pass filters 14 and 15 and the color modulator 16 are desired to be measured, the switching means 22y, 22i and 22q are controlled such that the external test signals Is and Qs can be selected.

When the delay time difference between the luminance signal Y and the Q-axis signal Q is measured, a measurement reference should be a reference line L whose level is a half envelop amplitude of leading and trailing edges of the luminance signal Y as shown in FIG. 13. The time difference $\Delta tf$ and $\Delta tb$ between the Q-axis signal Q and the luminance signal Y are measured at the reference level L of the leading and trailing edges. An average value $\Delta(=(\Delta tf+\Delta tb)/2)$ is obtained as the delay time difference between the luminance signal Y and the Q-axis signal Q.

Such measurement system for the color encoder has the following disadvantages.

(1) The specified signal for the measurement item is selected and the selected test signal is applied to the color encoder 10. The video camera generates all the three component signals R, G and B indeed. Thus, the characteristic is measured in a condition different from the practical operation. Since the test signal for the measurement item is a single composite signal instead of an ideal test signal, a pseudo signal is used as the test signal.

Such measurement cannot obtain the actual characteristic of the color encoder 10 for the measurement item. Since the measurement result is based on the pseudo signal, the characteristic of the practical operation is only estimated.

(2) The switching means in the color encoder 10 are controlled such that unnecessary signals for the measurement item are not outputted. For example, when the amplitude/frequency characteristic of the luminance signal Y is measured, the I-axis signal I and the Q-axis signal Q are controlled not to be produced. If only the luminance signal Y is desired to be generated in the ideal matrix construction, the output levels of the I-axis signal I and the Q-axis signal Q should be zero.

There is a possibility that the matrix circuit 13 is not the same as the construction designed in accordance with a matrix arithmetic. In this instance, if the measurement is not done under the condition that the I-axis signal I and the Q-axis signal Q are generated from the matrix circuit 13, the measurement result is not based on the practical operation of the color encoder 10.

When it is desired to measure a cross talk between the luminance signal Y and the I-axis signal I and between the luminance signal Y and the Q-axis signal Q by such measurement system, the cross talk value may not measured accurately because of the reasons discussed hereinbefore.

(3) It is troublesome to measure the delay time difference between the luminance signal Y and the I-axis signal I and between the luminance signal Y and the Q-axis signal Q because the delay time difference should be measured at both the leading and trailing edges as shown in FIG. 13 and the average should be calculated.

In order to execute this measurement, a considerably complex test signal should be switched and processed because only one test signal is applied to the matrix circuit 13 for the measurement period.

(4) The color encoder 10 as the device under test includes the unnecessary circuits for the practical operation. These circuits are the switching means 22y, 22i and 22q, the input terminals or the like. Since the color encoder 10 needs to include the additional circuits necessary only for the characteristic measurement, it is expensive in cost.

As being discussed hereinbefore, the prior color encoder measurement system is impossible to measure the characteristics at the practical operation and is troublesome to measure them.

Accordingly, there is a need for a color encoder measurement system which is free from the aforementioned disadvantages, is possible to measure the characteristics at the practical operation and is simple in the measurement.

SUMMARY OF THE INVENTION

According to the present invention, in order to overcome the aforementioned disadvantages, a color encoder measurement system comprises a color encoder whose output characteristics are to be measured, and a test signal generator for generating a test signal to be applied to the color encoder. The test signal generator generates R, G and B component signals as the test signals. The output amplitude level and the output phase of the test signal generator are adjusted such that the color encoder produces at least one of the luminance signal, the I-axis and Q-axis signals in accordance with the measurement item.

In a case of an NTSC color encoder 10 shown in FIG. 1, a test signal generator 30 outputs as the test signals the component signals R, G and B having the same level when the amplitude/frequency characteristic of the luminance signal Y is measured. As the result of the matrix operation of the component signals R, G and B having the same level, only the luminance signal Y is derived by reference to the following equation 3. By the operation of the matrix circuit 13, the component signals R, G and B are combined at a predetermined rate (in amplitude and phase), the matrix circuit 13 produces the composite signals (luminance signal Y, I-axis signal I and Q-axis signal Q) for the measurement item.

Thus, the component signals R, G and B are applied as the test signals to the color encoder 10 simultaneously and only the predetermined composite signal is derived, so that each characteristic can be measured under the same condition as a practical operation. It is possible to measure the matrix error for each of the I-axis and the Q-axis. It should be noted that a special measurement construction is not necessary to the color encoder 10.

The present invention is pointed out with particularity in the appended claims. Other objects and advantages of the present invention will become apparent to those having ordinary skill in the art when taken in conjunction with the accompanying drawings.

DRAWINGS

FIG. 3 shows a table of a color encoder characteristic measurement test signals;

FIG. 10 shows a waveform representative of an ideal delay time characteristic;

FIG. 11 shows a waveform representative of an actually measured delay time characteristic;

DETAILED DESCRIPTION OF THE INVENTION

One embodiment of a color encoder measurement system according to the present invention will be described by reference to the attached drawings in which the invention is applied to the NTSC color encoder. The measurement theory of this invention will be discussed first.

A matrix operation for the NTSC system will be shown by an equation 1 wherein each signal component is represented by the symbol of each signal in order to simplify the explanation.

[EQUATION 1]

$$Y = 0.30\,R + 0.59\,G + 0.11\,B$$
$$I = 0.60\,R - 0.28\,G - 0.32\,B$$
$$Q = 0.21\,R - 0.52\,B + 0.31\,B$$

The composite television signal M is represented as follows:

[EQUATION 2]

$$M = Y + Q\sin(2\pi f_{sc}\,t + 33\text{ degrees}) + I\cos(2\pi f_{sc}\,t + 33\text{ degrees})$$

The inverse matrix of the equation 1 is represented by the following equation 3.

[EQUATION 3]

$$R = 1.00\,Y + 0.96\,I + 0.62\,Q$$
$$G = 1.00\,Y - 0.27\,I - 0.65\,Q$$
$$B = 1.00\,Y - 1.10\,I + 1.70\,Q$$

In this equation 3, the following relationships are obtained.

(a) If $I = Q = 0$, $R = Y$, $G = Y$ and $B = Y$. When the input terminals 12g, 12b and 12r of the color encoder 10 receive the component signals R, G and B having the same amplitude as the test signal, the matrix circuit 13 produces only the luminance signal Y.

(b) When the input terminals receive the component signals R, G and B whose amplitudes are $R = 0.96$, $G = -0.27$ and $B = -1.10$, $Y = 0$ and $Q = 0$. Thus, only the I-axis signal I is produced from the matrix circuit 13.

(c) When the input terminals receive the component signals R, G and B whose amplitudes are $R = 0.62$, $G = -0.65$ and $B = 1.70$, $Y = 0$ and $I = 0$. Thus, only the Q-axis signal Q is produced from the matrix circuit 13.

As discussed hereinbefore, only composite signal necessary for the measurement item can be outputted by applying these three component signals R, G and B simultaneously and selecting the amplitude ratio therebetween.

Figure 1:
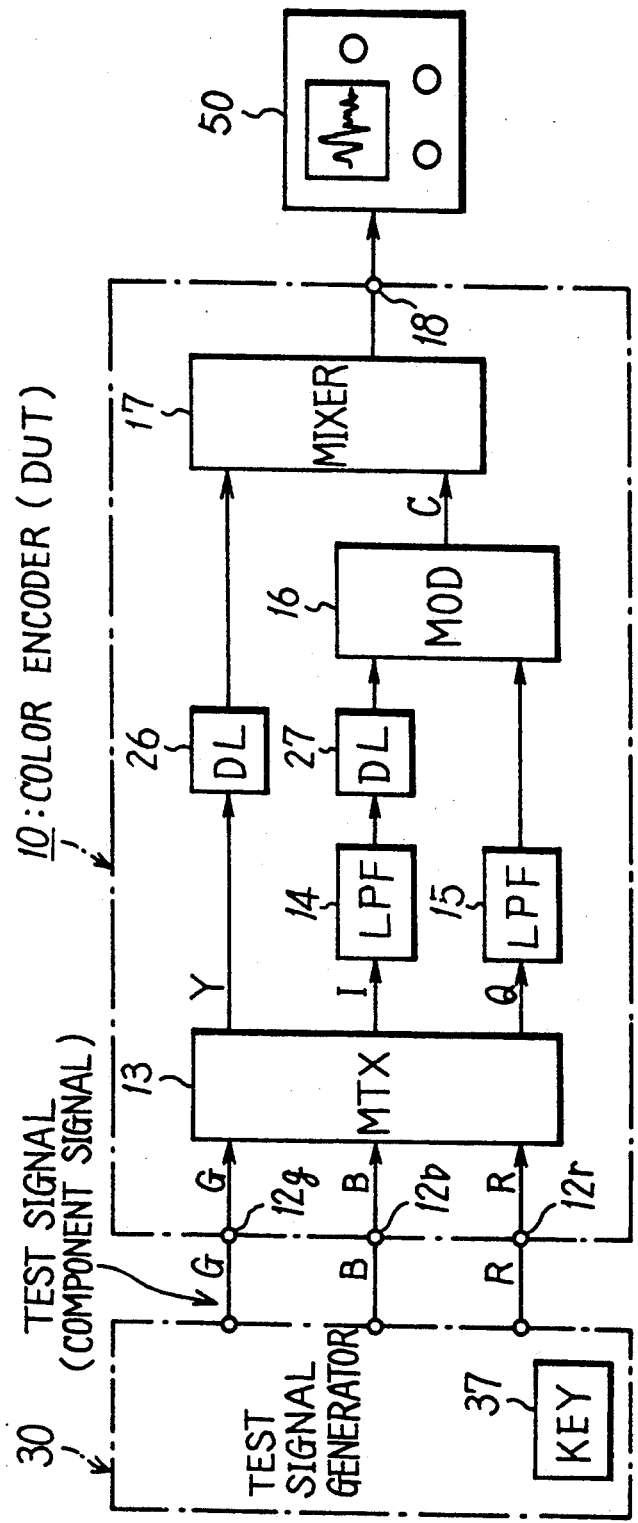
FIG. 1 shows a block diagram of one embodiment of a color encoder measurement system according to the present invention.
Figure 12:
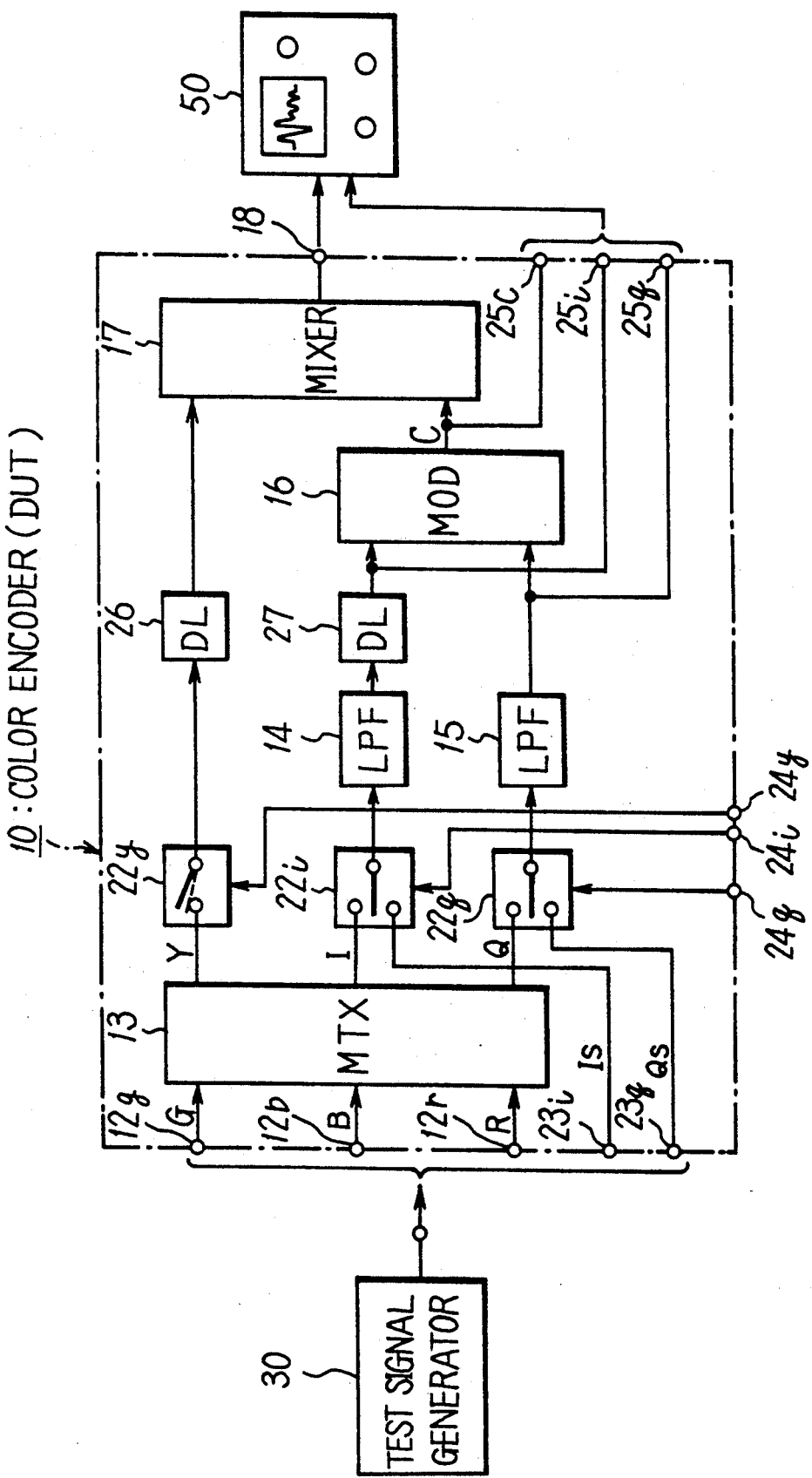
FIG. 12 shows a block diagram of a prior color encoder measurement system.

Referring to FIG. 1, there is shown a block diagram of the present invention. This block diagram includes the color encoder 10 as the DUT, the test signal generator 30 and the oscilloscope 50 as the waveform observation apparatus similarly to the aforementioned prior art. The construction of the color encoder 1 is the same as a color encoder used in the broadcasting station and does not include the switching means or the like used only for the measurement as shown in FIG. 12. Thus, the color encoder 10 used in the present invention comprises the matrix circuit 13, the pair of low pass filters 14 and 15, the color modulator 16, the delay circuits 26 and 27 and the mixer 17. An operation key 37 in the test signal generator 30 represents a group of operation keys for selecting the measurement items.

Figure 2:
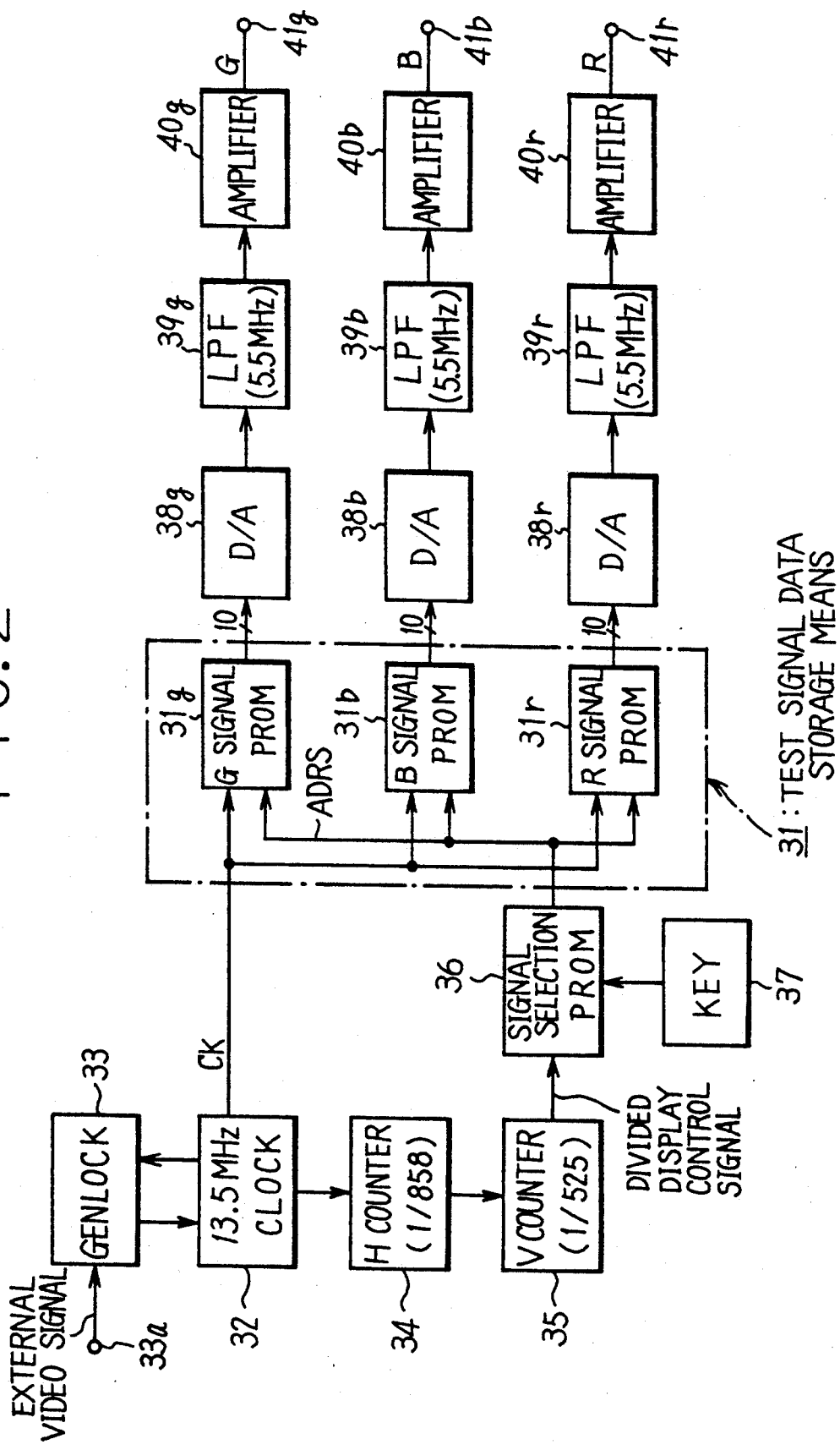
FIG. 2 shows a block diagram of one example of a test signal generator used in the present invention.

FIG. 2 shows one example of the test signal generator 30. Storage means 31 is provided to store the test signal data. The test signal data are digital data for producing the component signals as the test signals for the measurement item to be tested by this measurement system and are stored in corresponding memory means 31g, 31b and 31r respectively. These memory means 31g, 31b and 31r may be PROMs used as LUTs (Look Up Tables).

FIG. 3 shows the relationship between the measurement item examples and the test signals necessary for the measurement items. One example of the test signal in FIG. 3 will be discussed. A sweep signal is a test signal used to measure an amplitude characteristic of the composite signal outputted from the color encoder 10 or to measure a frequency characteristic at the continuous frequency. A multi-burst signal is used to measure a characteristic at a predetermined discrete frequency.

The test signal data corresponding to the measurement items are selected (or addressed) in accordance with the measurement item, and the data are read in synchronously with an input clock CK. For example, when the sweep signal of the luminance signal Y is addressed, the data groups are previously written in the predetermined areas of the memory means 31g, 31b and 31r so that a plurality of frequencies forming the sweep signal (e.g., 0.2 MHz-5.5 MHz; frequency markers are sine wave frequency of 0.5 MHz, 1.0 MHz, 2.0 MHz, 3.0 MHz, 4.0 MHz and 5.0 MHz) are outputted from the corresponding memory means 31g, 31b and 31r in the predetermined output timing and number of cycles. The other signals are constructed similarly to this sweep signal, so that no detailed description will be made.

The test signal generator 30 is constructed as described hereinafter in order to read the data from the test signal data storage means 31 storing the data and to provide them to the color encoder 10.

A clock generator 32 generates the system clock (basic clock) CK. In this example, the system clock frequency is determined to 13.5 MHz in order to apply this system to both the NTSC and PAL systems. A genlock circuit 33 is used to synchronize the system clock CK with an external video signal applied at a terminal 33a in an external synchronization mode.

The system clock CK frequency is divided by an H (horizontal) counter 34. In the NTSC system, the frequency of the clock CK is divided by 858 to produce a horizontal clock signal. This horizontal clock signal is applied to a V (vertical) counter 35 so that the frequency thereof is divided by 525 and a vertical clock signal is produced. The vertical clock signal is applied as a screen dividing display control signal to a test signal selection circuit 36. A test signal selection circuit 36 produces an address signal ADRS to read the test signal data for the corresponding measurement item from the storage means 31. The address signal ADRS is applied to the memory means 31g, 31b and 31r. An operation key 37 determines which test signal is selected. The test signal selection circuit 36 may be a PROM storing predetermined address data.

A reason why the vertical clock signal is used to select the test signal will be discussed hereinafter. It is easy to understand a phenomenon by displaying all the waveforms within one line on a screen simultaneously when the waveform of the test signal is observed by the oscilloscope 50. For realizing this, a plurality of different waveforms are displayed on the single screen simultaneously within one line.

Figure 7:
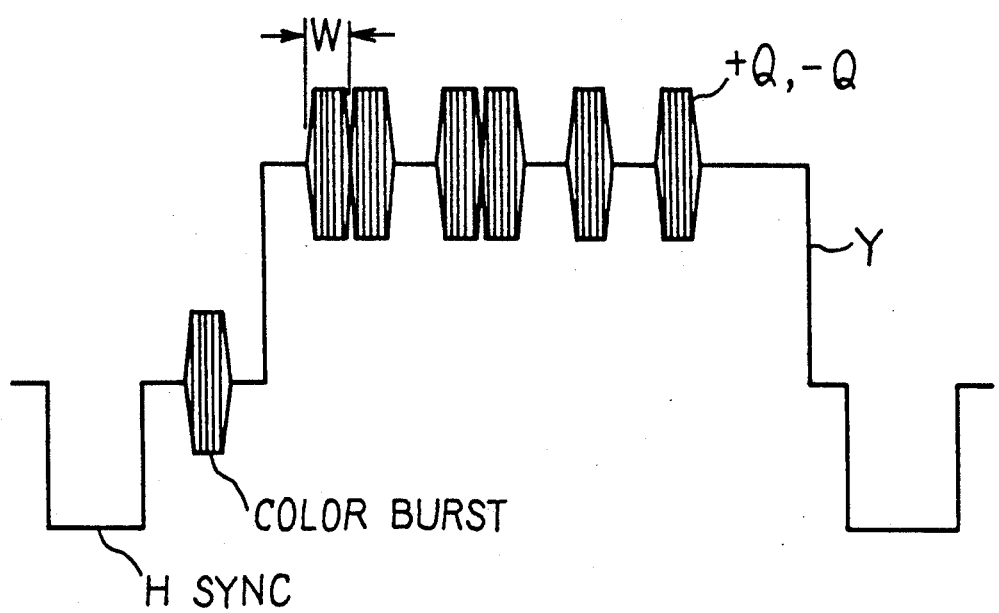
FIG. 7 shows a waveform of one example of the color encoder output for a Q-axis signal.

For example, when a delay time difference between Y and Q is measured, there is a possibility that the +Q-axis signal +Q and −Q-axis signal −Q are used in addition to the luminance signals +Y and −Y. In order to display these signals within one line as shown in FIG. 7, the luminance signals +Y and −Y shown in FIG. 8 and the +Q-axis signal +Q and the −Q-axis signal −Q shown in FIG. 9 are used as the test signals and they should be divided and displayed on one screen. In this instance, a screen S is divided by four in accordance with the signals +Y, −Y, +Q and −Q and divided areas Sa, Sb, Sc and Sd correspond to the aforementioned signals as shown in FIG. 4.

Figure 4:
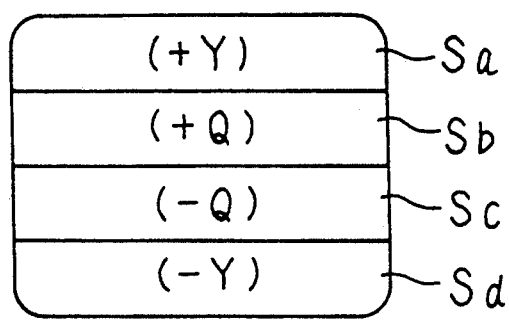
FIG. 4 shows a screen display example in which the screen is divided.

In order to read the test signals in a time sharing manner and to display them on the divided areas Sa through Sd as shown in FIG. 4, the V counter 35 of FIG. 2 is used and the produced vertical clock signal is used as the screen dividing display control signal.

Referring to FIG. 2 again, the component signals R, G and B of the test signals for the corresponding measurement item are read from the corresponding memory means 31g, 31b and 31r. The read component signals are converted into analog signals by D/A converters 38g, 38b and 38r and are applied to low pass filters 39g, 39b and 39r to limit the bandwidth of the analog signals in order to eliminate unnecessary high frequency signals. In this example, the bandwidth is limited to 5.5 MHz. The bandwidth limited component signals R, G and B are derived from the output terminals 41g, 41b and 41r through buffer amplifiers 40g, 40b and 40r.

These analog signals R, G and B are mixed with a vertical sync signal and a horizontal sync signal to produce the NTSC television signal if necessary. A circuit for this operation is not shown.

The test analog component signals R, G and B are produced for the measurement item as discussed hereinbefore and they are applied to the color encoder 10 shown in FIG. 1. The composite signal waveform derived from the encoder 10 is observed by the oscilloscope 50.

Figure 5:
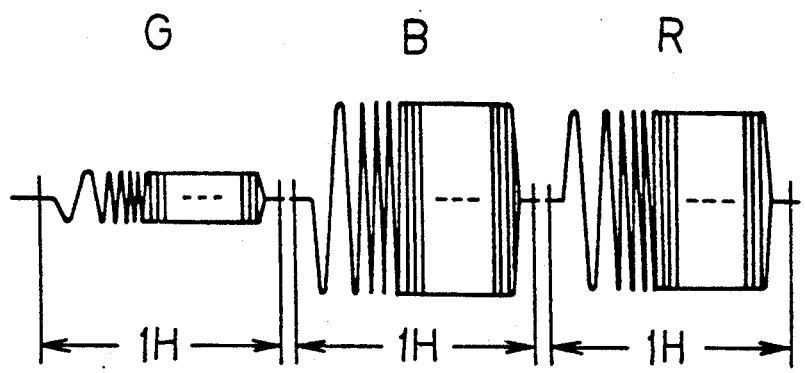
FIG. 5 shows a waveform of a test signal for an I-axis signal.
Figure 6:
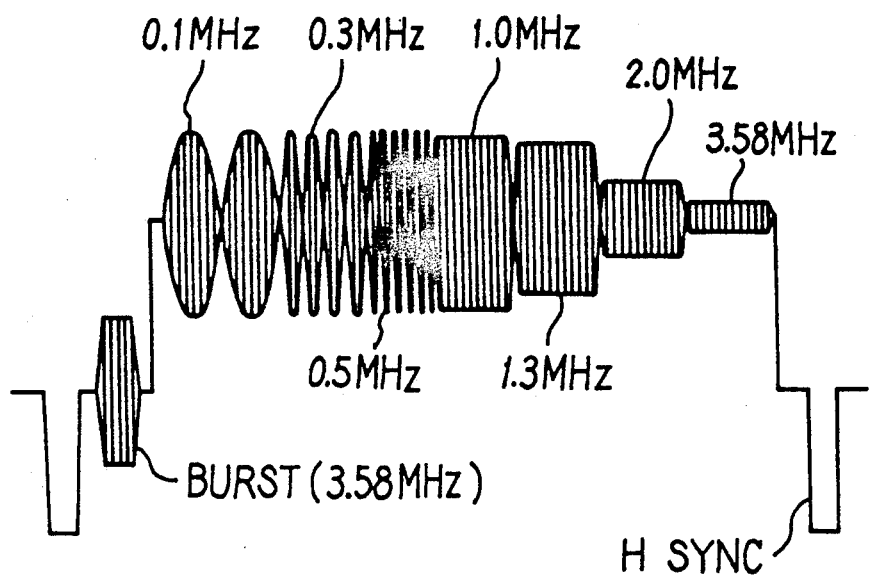
FIG. 6 shows a waveform of one example of a color encoder output for the I-axis signal.

The test signal will be described in detail. FIGS. 5 and 6 show the test signals for measuring the amplitude/frequency characteristic of the I-axis signal. These test signals are the multi-burst signals for the I-axis signal I.

The multi-burst signal consists of a plurality of burst signals whose frequencies are different from each other and the burst signals are positioned within one line in time sequence. The multi-burst signal is proper to measure the amplitude/frequency characteristic at the predetermined frequencies. By adjusting the amplitude of each component signal of the burst signal to the predetermined ratio as discussed hereinbefore, the color encoder 10 produces the modulated multi-burst signal consisting of only the I-axis or the Q-axis signal. FIG. 5 shows the amplitude ratio among the component signals R, G and B for producing the modulated color burst signal of the I-axis signal shown in FIG. 6. In FIG. 6, a reference signal having a frequency 0.1 MHz is a reference to measure the amplitude/frequency characteristic at each the burst signal.

According to the Wireless Telegraphy Act., the amplitude/frequency characteristic of the color encoder 10 is determined as follows:
the attenuation of the I-axis signal is
 less than 2 dB attenuation at 1.3 MHz
 over 20 dB attenuation at 3.6 MHz
the attenuation of the Q-axis signal is
 less than 2 dB attenuation at 0.4 MHz
 less than 6 dB attenuation at 0.5 MHz
 over 6 dB attenuation at 0.6 MHz. Each burst frequency is determined to 0.1 MHz, 0.3 MHz, 0.5 MHz, 1.0 MHz, 1.3 MHz, 2.0 MHz or 3.58 MHz as shown in FIG. 3 in order to make the above discussed measurement be easy. However, these are the burst frequencies for the I-axis signal.

A bar waveform is generally used as the amplitude reference flag. However, in this example, the output amplitude of the 0.1 MHz burst signal is adjusted to the reference amplitude precisely, so that a sine wave having a single frequency component is used instead of the bar signal having high frequency components.

In a prior art, there is a no-signal zone between the adjacent burst signals in order to distinguish each burst signal easily. In this example, there is not the no-signal zone and the burst signals are generated continuously as shown in FIGS. 5 and 6.

The main reasons of eliminating the no-signal zone are as follows: First, since the burst frequency is low and one cycle period of the sine wave is long, it is difficult to get enough number of cycles to measure if the no-signal zone is provided. Second, the burst envelop has high frequency components and the bandwidth of the burst envelop is limited by the low pass filter 14 in FIG. 1. Thus, ringing may occur at the initial and ending portions of the burst signal and it is difficult to measure the amplitude precisely. Third, it is easy to distinguish each burst signal of the modulated multi-burst signal even if there is not the no-signal zone.

FIG. 7 shows a waveform example of measuring the delay time characteristic. This example is used to measure the delay time difference between the luminance signal Y and the Q-axis signal. In FIG. 7, plus and minus square waves are superimposed on the luminance signal Y and the following test signal components are used so as to measure the delay time between the +/−Q-axis signals and the luminance signal Y and between the luminance signal and the Q-axis signal.

Figure 8A:
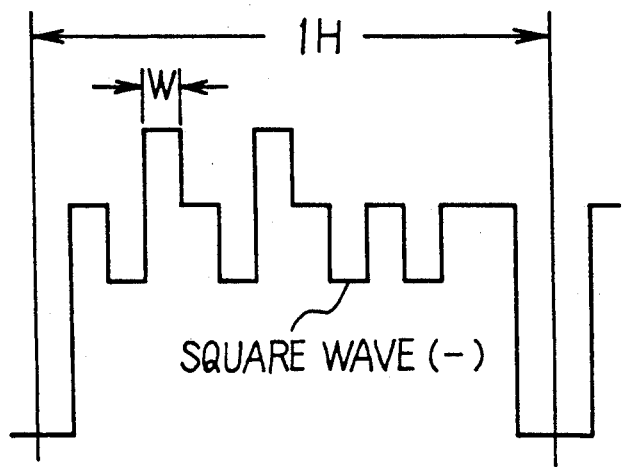
FIGS. 8A and 8B show waveforms of one example of a luminance signal used for a delay time measurement.
Figure 8B:
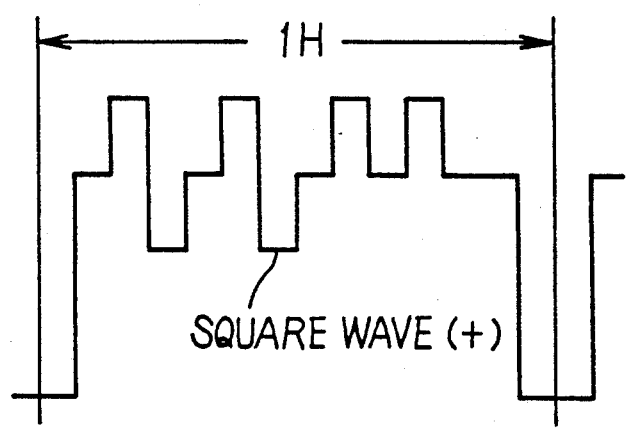

The test signal components are the luminance signal (bar signal) +Y on which the square wave (having the width W) is added as shown in FIG. 8A and the luminance signal −Y in which the polarity of the square wave is inverted as shown in FIG. 8B. The luminance signal +Y is outputted to the divided area Sa shown in FIG. 4 and the luminance signal −Y is outputted to the divided area Sd.

Figure 9A:
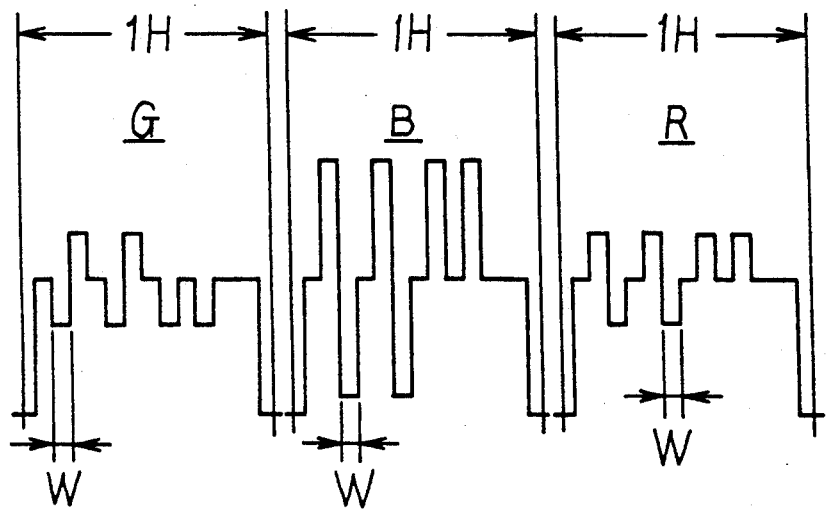
FIGS. 9A and 9B show waveforms of one example of a Q-axis signal used for a delay time measurement.
Figure 9B:
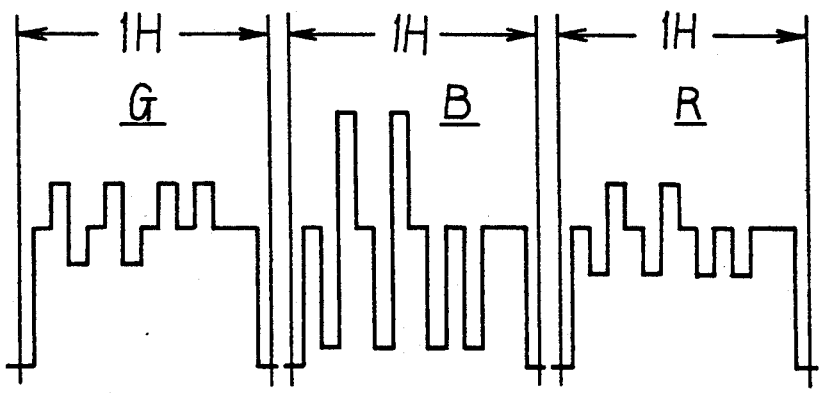

FIG. 9A shows the component signals (square wave signals) R, G and B having the predetermined amplitude ratio for the Q-axis test signal. The horizontal positions and widths (W) of these component signals R, G and B are the same as the square wave superimposed on the luminance signal of FIG. 8A. It should be noted that the waveform of FIG. 9 is compressed in horizontal in order to understand the amplitude ratio easily. FIG. 9B shows the component signals R, G and B for the Q-axis signal in which the amplitude ratio is the same as FIG. 9A but the square wave polarity is inverted. The output timing is selected such that the Q-axis signal +Q is outputted to the divided area Sb of FIG. 4 and the Q-axis signal −Q is outputted to the divided area Sc.

The luminance signal of FIG. 8 and the Q-axis signal of FIG. 9 are applied to the color encoder 10 in sequence every ¼ field as shown in FIG. 4 and these signals become the color encoder output as shown in FIG. 7. The color encoder output is a combination of the positive and negative square wave envelops superimposed on the luminance signal and the color subcarrier signal (3.58 MHz) of the modulated Q-axis signal.

FIG. 10 shows a magnified portion of FIG. 7. A point p represents a cross point of the positive and negative square wave envelops or the cross point between the falling envelop of the positive square wave and the rising envelop of the negative square wave. A point q represents a zero point where the amplitudes of the positive and negative Q-axis signals are zero. FIG. 10 shows an ideal characteristic (match characteristic) for the timing error characteristic wherein there is no timing error between the luminance signal and the Q-axis signal, the points p and q matches with each other and the delay time difference Δ of Y-Q is zero.

However, it is difficult to design the ideal color encoder 10 in a practical manner. An actual case is shown in FIG. 11 wherein the Q-axis signal is slightly delayed from the luminance signal and the delay time difference Δ may occur. This delay time difference Δ is adjusted by inserting the delay circuits 26 and 27 into the luminance signal path and the I-axis signal path and this error is checked whether it is within a tolerance (+/−20 nsec, preferably +/−5 nsec) determined by the Wireless Telegraphy Act. If the error is not within the tolerance, the circuit constants of the color encoder 10 are adjusted such that the error becomes within the tolerance.

In order to measure in a high resolution, the rising and falling times of the square wave signal should be very short. In this example, they are set to 187.5 nsec (1.5 T where T is a half periode of frequency band width) and the square wave signal having the 2.0 T rising time can be produced. If the rising time is slow, the precise time measurement cannot be done because the width of the zero point q become wide when the output waveform is magnified on the display screen.

Figure 13:
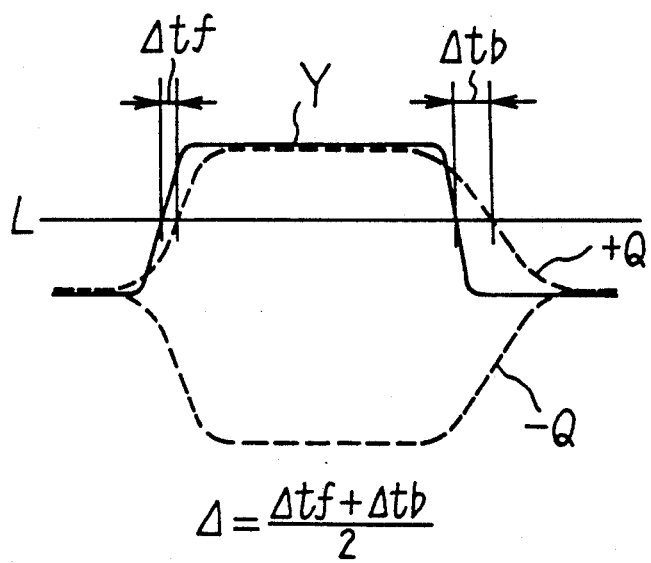
FIG. 13 shows a waveform of a prior delay time measurement example.

The delay time difference can be directly read from the display by using the inverted and non-inverted square wave signals for each of the luminance and Q-axis signals. Thus, it is not necessary the troublesome measurement operation and the computing process discussed by reference to FIG. 13.

The delay time characteristic of Y-I can be measured by selecting properly the component signals R, G and B to be applied to the color encoder 10.

The actual color encoder measurement system has many measurement items in addition to the above discussed examples as shown in FIG. 3. Some of them will be further explained.

(1) Sweep Signals of the I-axis and Q-axis Signals

The sweep signal is the test signal for measuring the amplitude/frequency characteristic by continuous varying frequency. When the sweep signals having the above discussed predetermined ratio amplitudes are applied to the color encoder 10 simultaneously, the color encoder 10 produces the modulated sweep signal consisting only of the I-axis or Q-axis signal. The output waveform is observed to measure each amplitude/frequency characteristic.

In this instance, the frequency varying range of the sweep signal of the Q-axis signal is set between 0.3 MHz and 1.3 MHz in order to satisfy the measurement frequency points specified by the Wireless Telegraphy Act. Since the I-axis signal should be measured under the same condition as the Q-axis signal, two kinds of sweep signals are used in which one is for a low band (0.3 MHz-1.3 MHz) of the same frequency range as the sweep signal of the Q-axis signal and the other one is for a high band (1.0 MHz-3.58 MHz) for measuring the remainder frequency (refer to FIG. 3). Since the high band sweep signal includes the 3.58 MHz burst signal, it is possible to measure the amplitude/frequency characteristic at 3.58 MHz.

The low band sweep signals of the Q-axis and I-axis signals include the 0.1 MHz sine wave signal as the amplitude reference flag because of the same reason as the above discussed multi-burst signal.

Since it is necessary to distinguish easily the measurement frequencies specified by the Wireless Telegraphy Act. from the waveform, one frame (one screen) is divided to display the frequency marker signal (square wave signal) of the luminance component on the display area different from the sweep signal display area. In this instance, two kinds of square wave signals having the positive and negative polarities are used, and the cross point of the rising and falling portions of the two kinds of square wave signals on the line display indicates the measurement frequency position. This is useful to distinguish the measurement frequency from the waveform easily. The amplitude of the frequency marker signal is adjusted to match with that of the color encoded sweep signal such that it can be used as the reference amplitude.

(2) Pulse Signals of the I-axis and Q-axis Signals

By using the component signals, the color encoder produces the modulated pulses of the I-axis and Q-axis signals. For this end, the ratio among the component signals R, G and B is R=1.96, G=0.73 and B=−0.10 and they are applied as the sine square pulses to the color encoder 10. Thus, the color encoder output is the modulated pulse of the I-axis phase.

In addition, the component signals R, G and B are produced in which the amplitude ratio is R=1.62, G=0.35 and B=2.70 and they are applied as the sine square pulses to the color encoder 10. Thus, the color encoder output is the modulated pulse of the Q-axis phase.

The above discussed embodiments are the cases that the present invention is applied to the NTSC color encoder, however, this invention can be applied to the PAL color encoder. The PAL matrix arithmetic equations and the color modulation equation (=M) are well know and are shown in the following equations 4 and 5.

[EQUATION 4]
$$Y = 0.299R + 0.587G + 0.114B$$
$$U = -0.147R - 0.289G + 0.436B$$
$$V = 0.625R - 0.515G - 0.100B$$

[EQUATION 5]
$$M = Y + U \sin(2\pi f_{sc} t) + / - V \cos(2\pi f_{sc} t)$$

The inverse matrix of the equation 4 is represented by the following equation 6.

[EQUATION 6]
$$R = Y + 1.140V$$
$$G = Y - 0.394V - 0.581U$$
$$B = Y + 2.028U$$

Judging from the equation 6, the PAL color encoder has the following characteristics.

(a) When the component signals R, G and B having the same amplitudes are applied to the input terminals of the color encoder, only the luminance signal Y is produced.

(b) If the ratio of the component signals is R=1.140 and G=−0.394, only the V-axis signal is produced.

(c) If the ratio of the component signals is G=−0.581 and B=2.028, only the U-axis signal is produced.

Thus, according to the present invention, it is not necessary to modify the color encoder of the PAL system to measure the characteristics of the practical operation mode. It can be understood that the present invention can be applied to the measurement system of the other systems because the characteristics of the practical operation can be measured only by changing the amplitude ratio of the component signals.

As being understood from the foregoing description, the color encoder measurement system of the present invention generates test signals from the test signal generator by selecting the output amplitude ratio of the component signals properly such that the color encoder produces the luminance signal, the I-axis signal, the Q-axis signal or the like as the encoder output signal.

Thus, the encoder output signal may be only the luminance signal or the color modulation signal consisting only of the I-axis or Q-axis signal by applying simultaneously the three component signals having the predetermined amplitude ratio based on the measurement item. In this instance, the three component signals are simultaneously applied to the color encoder similarly to the practical mode.

Since many kinds of characteristics can be measured under the condition that the color encoder operates similarly to the practical operation mode, the measurement result of the color encoder is very precise. Moreover, it is not necessary to add the special measurement circuit and the input/output systems to the color encoder. Therefore, this measurement system is ideal with respect to the conventional measurement systems.

While we have shown and described herein the preferred embodiments of the present invention, it will be apparent to those skilled in the art that many changes and modifications may be made without departing from the present invention in its broader aspect. Thus, the scope of the invention is defined and limited only by the claim which follows.

We claim:

1. A method of measuring a characteristic of an NTSC type color encoder, comprising the steps of:
    adjusting the amplitudes of R, G and B component signals to be in the ratio 1:1:1 so that only a luminance signal is produced by said color encoder when the R, G and B component signals are simultaneously applied to said color encoder;
    applying the R, G and B component signals to said color encoder simultaneously; and
    measuring the output signal from said color encoder.

2. A method according to claim 1 wherein the output signal from said color encoder is observed by an oscilloscope to measure the characteristic of said color encoder.

3. A method of measuring a characteristic of an NTSC type color encoder, comprising the steps of:
    adjusting the amplitudes of R, G and B components signals to be in the ratio 0.96:−0.27:−1.10 so that only an I-axis signal is produced by said color encoder when the R, G and B component signals are simultaneously applied to said color encoder;
    applying the R, G and B component signals to said color encoder simultaneously; and
    measuring the output signal from said color encoder.

4. A method according to claim 3 wherein the output signal from said color encoder is observed by an oscilloscope to measure the characteristic of said color encoder.

5. A method of measuring a characteristic of an NTSC type color encoder, comprising the steps of:
    adjusting the amplitudes of R, G and B component signals to be in the ratio 0.62:−0.65:1.70 so that only a Q-axis signal is produced by said color encoder when the R, G and B component signals are simultaneously applied to said color encoder;
    applying the R, G and B component signals to said color encoder simultaneously; and
    measuring the output signal from said color encoder.

6. A method according to claim 5 wherein the output signal from said color encoder is observed by an oscilloscope to measure the characteristic of said color encoder.

7. A method of measuring a characteristic of a PAL type color encoder, comprising the step of:
    adjusting the amplitudes of R, G and B component signals to be in the ratio 1:1:1 so that only a luminance signal is produced by said color encoder when the R, G and B component signals are simultaneously applied to said color encoder;
    applying the R, G and B component signals to said color encoder simultaneously; and
    measuring the output signal from said color encoder.

8. A method according to claim 7, wherein the output signal from said color encoder is observed by an oscilloscope to measure the characteristic of said color encoder.

9. A method of measuring a characteristic of a PAL type color encoder, comprising the steps of:
    adjusting the amplitudes of R and G component signals to be in the ratio 1.140:0.394 so that only a V-axis signal is produced by said color encoder when the R and G component signals and a B component signal are simultaneously applied to said color encoder;
    applying the R, G and B component signals to said color encoder simultaneously; and
    measuring the output signal from said color encoder.

10. A method according to claim 9, wherein the output signal from said color encoder is observed by an oscilloscope to measure the characteristic of said color encoder.

11. A method of measuring a characteristic of a PAL type color encoder, comprising the steps of:
    adjusting the amplitudes of G and B component signals to be in the ratio−0.581:2.028 so that only a U-axis signal is produced by said color encoder then the G and B component signals and an R component signal are simultaneously applied to said color encoder;
    applying the R, G and B component signals to said color encoder simultaneously; and
    measuring the output signal from said color encoder.

12. A method according to claim 11, wherein the output signal from said color encoder is observed by an oscilloscope to measure the characteristic of said color encoder.

13. A method of testing a color encoder system, comprising:
    employing a color encoder to output in a time-divided sequence during the time of one field, a square wave luminance signal Y by inputting R, G and B signals having the same amplitude, a luminance signal −Y obtained by inverting only the polarity of the square wave portion of the luminance signal Y, a modulated Q-axis signal at the same position as said square wave by inputting R, G and B signals with the amplitude ratio of 0.62:−0.65:1.70, and a modulated −Q-axis signal obtained by inverting the polarity of only the square wave portion of the Q-axis signal; and measuring delay time difference from the zero-cross point between the luminance signals Y and −Y to the zero-cross point between the Q-axis signal and −Q-axis signal by applying these signals to a waveform monitoring device to line-display these signals on the same line at the same time.

14. A method of testing a color encoder system comprising:

employing a color encoder to output in a time-divided sequence during the time of one field, a square wave luminance signal Y by inputting R, G and B signals having the same amplitude, a luminance signal −Y obtained by inverting only the polarity of the square wave portion of the luminance signal Y, a modulated I-axis signal at the same position as said square wave by inputting R, G and B signals with the amplitude ratio of 0.96:−0.27:−1.10, and a modulated −I-axis signal obtained by inverting the polarity of only the square wave portion of the I-axis signal; and measuring delay time difference from the zero-cross point between the luminance signals Y and −Y to the zero-cross point between the I-axis signal and −I-axis signal by applying these signals to a waveform monitoring device to line-display these signals on the same line at the same time.

15. A method of testing a color encoder system, wherein an I-axis signal is multi-burst by R, G and B signals in each horizontal interval so that the frequency component of said I-axis signal is differentiated in the intervals, said R, G and B signals having the amplitude ratio of 0.96:−0.27:−1.10 to finally be an I-axis signal, said R, G and B signals having continuous output signals between the intervals of the R, G and B signals are inputted into a color encoder, said multi-burst I-axis signal is modulated by a subcarrier in said color encoder and the amplitude of said modulated multi-burst signal is measured by monitoring the waveform of the modulated multi-burst signal by means of a waveform monitoring device.

16. A method of testing a color encoder system, wherein a Q-axis signal is multi-burst by R, G and B signals in each horizontal interval so that the frequency component of said Q-axis signal is differentiated in the intervals, said R, G and B signals having the amplitude ratio of 0.62:−0.65:1.70 to finally be an Q-axis signal, said R, G and B signals having continuous output signals between the intervals of the R, G and B signals are inputted into a color encoder, said multi-burst Q-axis signal is modulated by a subcarrier in said color encoder and the amplitude of said modulated multi-burst signal is measured by monitoring the waveform of the modulated multi-burst signal by means of a waveform monitoring device.

* * * * *